(12) United States Patent
Yun et al.

(10) Patent No.: US 10,871,751 B2
(45) Date of Patent: Dec. 22, 2020

(54) ANTENNA FOR WEARABLE DEVICE

(71) Applicant: Samsung Electronics Co., Ltd., Suwon-si (KR)

(72) Inventors: Su Min Yun, Incheon (KR); Se Woong Kim, Gimhae-si (KR); Sang Bong Sung, Seongnam-si (KR); Chae Up Yoo, Seoul (KR); In Young Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 15/804,312

(22) Filed: Nov. 6, 2017

(65) Prior Publication Data
US 2018/0129170 A1    May 10, 2018

(30) Foreign Application Priority Data
Nov. 4, 2016   (KR) .................. 10-2016-0146979

(51) Int. Cl.
*H01Q 1/27* (2006.01)
*G04R 60/06* (2013.01)
(Continued)

(52) U.S. Cl.
CPC .......... *G04R 60/06* (2013.01); *G04G 17/045* (2013.01); *G04R 60/08* (2013.01); *G06F 1/163* (2013.01);
(Continued)

(58) Field of Classification Search
CPC ........ G04R 60/06; G04R 60/08; H01Q 5/364; H01Q 1/243; H01Q 1/273; H01Q 7/00; H01Q 9/0464; G04G 17/045; G06F 1/163
See application file for complete search history.

(56) References Cited

U.S. PATENT DOCUMENTS 6,278,873 B1 *  8/2001  Itakura .................. G04G 17/02
                                                    455/347
6,765,846 B2     7/2004  Saitou et al.
(Continued)

FOREIGN PATENT DOCUMENTS

CN      1312617 A      9/2001
CN    104638361 A      5/2015
(Continued)

OTHER PUBLICATIONS

International Search Report dated Feb. 22, 2018, issued in International Application No. PCT/KR2017/012491.
(Continued)

*Primary Examiner* — Dimary S Lopez Cruz
*Assistant Examiner* — Bamidele A Jegede
(74) *Attorney, Agent, or Firm* — Jefferson IP Law, LLP

(57) ABSTRACT

A wearable device mountable on a user's wrist is provided. The wearable device includes a housing having a metal structure, a display disposed in the housing and including a metal layer, the metal layer being disposed so as to be surrounded by the metal structure and to be spaced apart by a gap, a printed circuit board (PCB) disposed in the housing and including a ground area, and a control circuit disposed on the PCB and feeding a first point of the metal structure. Here, the metal layer is electrically connected with the ground area of the PCB at a second point spaced apart by an angle with respect to the first point.

18 Claims, 19 Drawing Sheets

(51) Int. Cl.
*G04R 60/08* (2013.01)
*H01Q 7/00* (2006.01)
*H01Q 9/04* (2006.01)
*H01Q 5/364* (2015.01)
*G04G 17/04* (2006.01)
*G06F 1/16* (2006.01)
*H01Q 1/24* (2006.01)

(52) U.S. Cl.
CPC ............ *H01Q 1/243* (2013.01); *H01Q 1/273* (2013.01); *H01Q 5/364* (2015.01); *H01Q 7/00* (2013.01); *H01Q 9/0464* (2013.01)

(56) References Cited

U.S. PATENT DOCUMENTS

| | | | |
|---|---|---|---|
| 9,196,952 | B2 | 11/2015 | Tran et al. |
| 9,196,964 | B2* | 11/2015 | Baringer ............ H01Q 9/0407 |
| 9,231,295 | B2 | 1/2016 | Chang |
| 9,356,661 | B2 | 5/2016 | Samardzija et al. |
| 9,503,130 | B2 | 11/2016 | Wu et al. |
| 9,531,062 | B2 | 12/2016 | Park et al. |
| 9,660,324 | B2 | 5/2017 | Baringer |
| 9,685,690 | B2 | 6/2017 | Samardzija et al. |
| 9,728,853 | B2 | 8/2017 | Hung |
| 9,728,854 | B2 | 8/2017 | Kim et al. |
| 9,891,667 | B2 | 2/2018 | Jung et al. |
| 2001/0010662 | A1 | 8/2001 | Saitou et al. |
| 2009/0231960 | A1 | 9/2009 | Hutcheson |
| 2010/0245177 | A1* | 9/2010 | Jagielski ............... H01Q 1/243 343/702 |
| 2012/0092822 | A1* | 4/2012 | Mooring ............... G06F 1/1613 361/679.21 |
| 2012/0182185 | A1* | 7/2012 | Parsche .................... H01Q 1/38 343/700 MS |
| 2013/0181874 | A1 | 7/2013 | Park et al. |
| 2014/0049443 | A1* | 2/2014 | Katz ........................ H01Q 7/02 343/871 |
| 2014/0266920 | A1 | 9/2014 | Tran et al. |
| 2014/0320357 | A1 | 10/2014 | Chang |
| 2015/0255871 | A1 | 9/2015 | Baringer |
| 2015/0311360 | A1* | 10/2015 | Fu ..................... H01L 31/02243 136/256 |
| 2015/0311960 | A1* | 10/2015 | Samardzija ............ H04B 5/02 455/90.3 |
| 2016/0036119 | A1 | 2/2016 | Baringer |
| 2016/0064804 | A1* | 3/2016 | Kim ..................... H01Q 15/008 343/702 |
| 2016/0064820 | A1* | 3/2016 | Kim ..................... H01Q 9/0421 343/767 |
| 2016/0104935 | A1* | 4/2016 | Hung ....................... H01Q 7/00 343/845 |
| 2016/0112076 | A1* | 4/2016 | Wu ....................... H04B 1/0475 455/41.2 |
| 2016/0124396 | A1* | 5/2016 | Choi ..................... H01Q 1/273 368/281 |
| 2016/0218414 | A1 | 7/2016 | Samardzija et al. |
| 2016/0252980 | A1* | 9/2016 | Park ...................... G06F 1/3287 345/184 |
| 2016/0255733 | A1* | 9/2016 | Jung ..................... G04B 37/225 361/759 |
| 2017/0045916 | A1* | 2/2017 | Kim ....................... G06F 1/1698 |
| 2017/0047647 | A1* | 2/2017 | Jung ..................... H01Q 1/273 |
| 2017/0048991 | A1* | 2/2017 | Kim ....................... G04G 17/04 |
| 2017/0214422 | A1* | 7/2017 | Na ......................... H04B 1/385 |
| 2017/0244818 | A1* | 8/2017 | Kim ...................... H01Q 9/42 |
| 2017/0309988 | A1 | 10/2017 | Samardzija et al. |
| 2018/0004247 | A1* | 1/2018 | Liu ........................ H01Q 13/10 |

FOREIGN PATENT DOCUMENTS

| | | |
|---|---|---|
| CN | 204668449 U | 9/2015 |
| CN | 105514603 A | 4/2016 |
| CN | 105573111 A | 5/2016 |
| EP | 2 615 685 A2 | 7/2013 |
| KR | 10-2016-0026581 A | 3/2016 |
| KR | 10-2016-0046279 A | 4/2016 |
| KR | 10-2016-0105015 A | 9/2016 |
| KR | 10-2017-0020139 A | 2/2017 |

OTHER PUBLICATIONS

European Search Report dated Mar. 19, 2018, issued in European Application No. 17200150.5-1205.

Chinese Office Action with English translation dated Oct. 10, 2020; Chinese Appln. No. 201780068022.3.

Indian Office Action dated Sep. 28, 2020; Indian Appln. No. 201937017156.

* cited by examiner

ANTENNA FOR WEARABLE DEVICE

CROSS-REFERENCE TO RELATED APPLICATION(S)

This application claims the benefit under 35 U.S.C. § 119(a) of a Korean patent application filed on Nov. 4, 2016 in the Korean Intellectual Property Office and assigned Serial number 10-2016-0146979, the entire disclosure of which is hereby incorporated by reference.

TECHNICAL FIELD

The present disclosure relates to an antenna of a wearable device.

BACKGROUND

The supply of a wearable electronic device (e.g., a smart watch, a hamlet, or the like) is proliferating to succeed a user terminal such as a smartphone or a tablet. The wearable electronic device is equipped with an antenna for wireless communication inside.

In general, a wearable electronic device that is being currently supplied is equipped with an antenna for a global navigation satellite system (GNSS). For example, the wearable electronic device may include a global positioning system (GPS) antenna. Besides, a Bluetooth (BT) antenna for connection with a mother device such as a smartphone and a cellular network antenna for supporting third generation (3G) or long term evolution (LTE) communication may be further included in the wearable electronic device.

For example, in the case of a conventional smart watch, it may be possible to implement the GPS antenna through a metal structure of a monopole shape mounted within a strap connected with the smart watch or to implement the GPS antenna by inserting a patch antenna into the inside of the smart watch. Besides, it may be possible to implement the GPS antenna through indirect feeding (e.g., coupling feeding) with the metal structure disposed on a front surface of the smart watch.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an antenna of a wearable device for solving the above-described problem and problems brought up in this specification.

Since an inner space of a wrist-mounted electronic device such as a smart watch is narrow, it is difficult to mount a plurality of antennas. In particular, there is a need to secure sufficient performance even though an antenna is mounted. Such an issue appears in various wearable devices, such as an ankle-mounted electronic device, a chest-mounted electronic device, a neck-mounted electronic device, and a head-mounted (or face-mounted) electronic device, as well as the wrist-mounted electronic device.

In the case of a monopole antenna implemented through a way to mount the antenna within a strap among conventional ways to implement an antenna, radiation performance is considerably reduced due to a human body while being mounted on a wrist. In the case of the patch antenna, antenna efficiency and directivity are excellent, but it may be difficult to apply the patch antenna to a recent smart watch equipped with various functions or sensors because the patch antenna occupies a lot of volume. In the case of an antenna using the coupling feeding, since a structure for coupling should be implemented within a limited space, it is difficult to improve efficiency and to miniaturize the antenna.

In accordance with an aspect of the present disclosure, a wearable device is provided. The wearable device includes a housing having a metal structure, a display disposed in the housing and including a metal layer, the metal layer being disposed so as to be surrounded by the metal structure and to be spaced apart by a gap, a printed circuit board (PCB) disposed in the housing and including a ground area, and a control circuit disposed on the PCB and feeding a first point of the metal structure. Here, the metal layer is electrically connected with the ground area of the PCB at a second point spaced apart by an angle with respect to the first point.

In accordance with another aspect of the present disclosure, a wearable device is provided. The wearable device includes a housing including an upper surface, a lower surface, and a side surface surrounding a space between the upper surface and the lower surface, the side surface including a ring-shaped member that is ring-shaped when viewed from an upper side of the upper surface and is formed of a conductive material, a binding structure connected to the housing and removably mountable in a part of a body of a user, a display exposed through the upper surface, wherein the display includes a first ground plane, which is substantially parallel with the upper surface, in the space, a PCB including a second ground plane, which is disposed between the display and the lower surface, in the space, a wireless communication circuit disposed in the PCB and electrically connected with a first point located in the ring-shaped member, a first conductive path electrically connected between a second point located at a rim of the first ground plane and the second ground plane, a second conductive path electrically connected between a third point located at the ring-shaped member and the second ground plane, and a processor disposed in the space and electrically connected to the display and the communication circuit, wherein, when viewed from an upper side of the upper surface, a first imaginary line extending from a center of the upper surface to the first point is substantially orthogonal to a second imaginary line extending from the center of the upper surface to the second point.

In accordance with various aspects of the present disclosure, it may be possible to implement an antenna having high efficiency and directivity by using a metal housing of a wearable electronic device and a metal structure of a display.

Also, it may be possible to improve user experiences by changing a radiation pattern of an antenna depending on various conditions.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
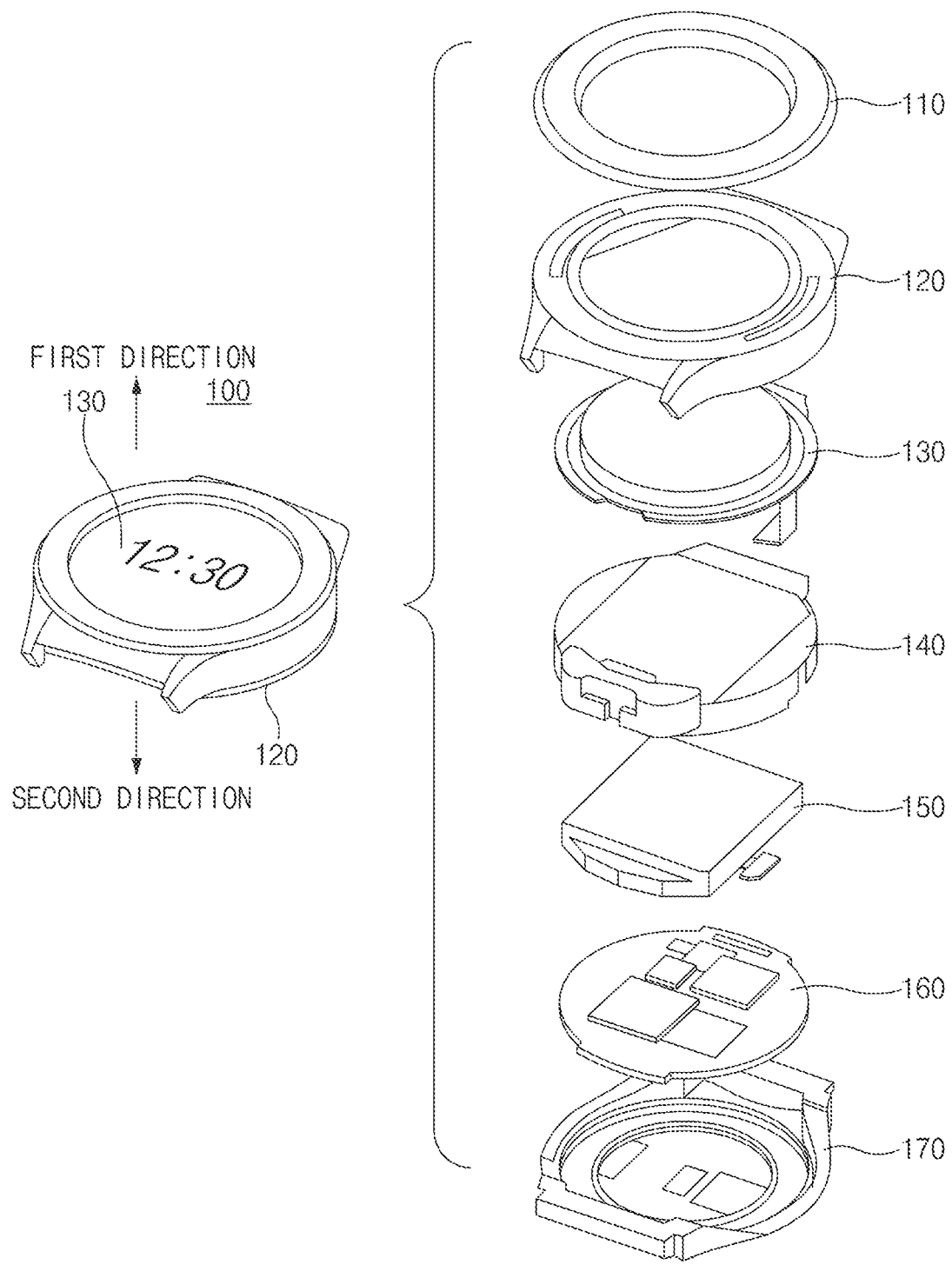
FIG. 1 illustrates an exploded view of a wrist-mounted electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an explored view of a wrist-mounted electronic device according to an embodiment of the present disclosure. In FIG. 1, a wrist-mounted electronic device may be understood as a smart watch. In this specification, the "wrist-mounted electronic device" or the "smart watch" is simply referred to as a "wearable device".

Referring to FIG. 1, a wearable device 100 may include a housing 120, a display 130, a bracket 140, a battery 150, a printed circuit board (PCB) 160, and a rear cover 170.

The housing 120 may protect various elements (e.g., the display 130, the battery 150, the PCB 160, and the like) disposed in the inside of the wearable device 100. An element corresponding to the housing 120 is specified in FIG. 1, but the housing 120 may be understood as the concept including all components constituting a case of the wearable device 100. In an embodiment, the housing 120 may include a bezel wheel 110 disposed to surround a through hole through which the display 130 is exposed. Additionally, the housing 120 may be understood as the concept including a cover glass disposed above the display 130, the rear cover 170, and the like.

According to an embodiment, at least a part of the housing 120 may include a conductive member such as metal. For example, a partial area of the housing 120, which forms a front surface of the wearable device 100, may be implemented with a metal structure of a ring shape. The metal structure may be electrically connected with a control circuit (e.g., an AP or a communication processor (CP)) disposed in the PCB 160, and the control circuit may allow the metal structure to operate as an antenna radiator by feeding the metal structure. In an embodiment, the bezel wheel 110 may be implemented with metal and may correspond to the above-described metal structure. In another embodiment, a partial area of the housing 120, which forms the front surface and/or a side surface of the wearable device 100, may be implemented with the metal structure. In this specification, for convenience of description, it is assumed that the partial area of the housing 120 forming the front surface of the wearable device 100 has the metal structure of the ring shape.

In an embodiment, the bezel wheel 110 may prevent a black matrix area of the display 130 from being exposed to the outside and may generate a user input by rotation.

In an embodiment, the display 130 may have a shape of a disk having a uniform thickness as a whole and may output an image, a text, or the like. As another example, at least a part of the display 130 may be exposed through a first surface of the housing 120, which faces in a first direction. In an embodiment, the display 130 may include a touch panel. For example, the display 130 may have a multi-layer structure including a display panel, a touch panel, a polarizing plate, a shield layer, and the like.

In an embodiment, the shield layer of the display 130 may be implemented with a metal material. For example, a copper (Cu) sheet may be disposed on a rear surface of the display 130 for the purpose of minimizing an influence of a noise generated in the display 130 on many components disposed in the PCB 160. The shield layer of the metal material may be utilized to improve performance of an antenna. In this specification, the shield layer of the metal material is simply referred to as a "metal layer".

In an embodiment, the display 130 may be electrically connected with the PCB 160 through a signal line for transmitting and receiving data. Also, the display 130 may be connected with a ground of the PCB 160 through the signal line or through a separate electrical path.

In an embodiment, the bracket 140 may mount and support internal components such as the display 130, the battery 150, and the PCB 160. The bracket 140 may be implemented with a non-conductive material (e.g., plastic).

In an embodiment, the battery 150 may be mounted in the bracket 140 and may be electrically connected with the PCB 160. The battery 150 may be charged by power from an external power source and may output the charged power to supply power for an operation of the wearable device 100.

In an embodiment, the PCB 160 may include a module, a chip, or the like needed to drive the wearable device 100. For example, the PCB 160 may include a processor, a memory, a communication circuit, and the like.

In an embodiment, the PCB 160 may include a plurality of layers, and at least one layer of the plurality of layers may function as a ground of an antenna.

In an embodiment, the rear cover 170 may be coupled with the housing 120 to fix and protect internal members. The rear cover 170 may be formed of a non-metal material or a non-conductive material.

Figure 2:
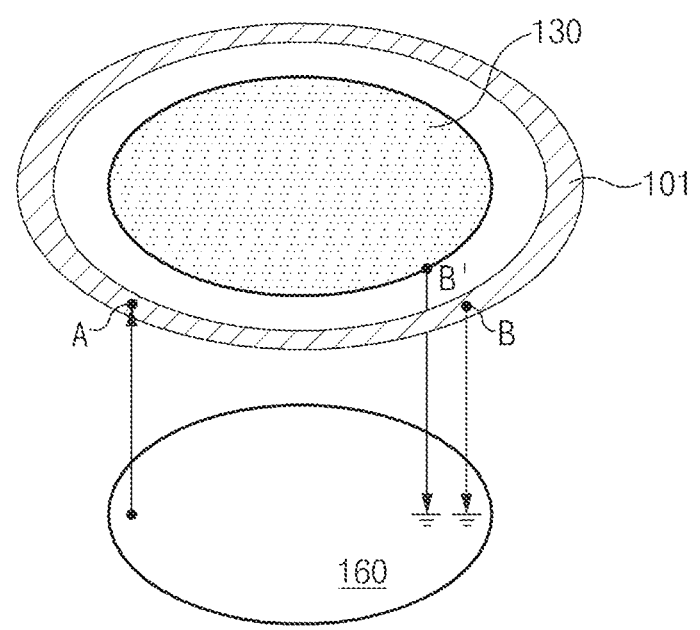
FIG. 2 illustrates feeding and a ground associated with a metal structure and a display, according to an embodiment of the present disclosure.

FIG. 2 illustrates feeding and a ground associated with a metal structure and a display, according to an embodiment of the present disclosure. FIG. 2 illustrates a part, which is associated with an operation of an antenna, of a configuration of the wearable device 100. Also, in this specification including FIG. 2, it is assumed that the display 130 and a metal structure 101 are in the form of a closed circle. However, various embodiments disclosed may be applied to the case where shape of a wearable device is a quadrangle or an ellipse.

Referring to FIG. 2, feeding may be made from the PCB 160 to a first point "A" of the metal structure 101. For example, a control circuit disposed in the PCB 160 may directly feed the metal structure 101 through a conductive connection member such as a C-clip.

The PCB 160 may be connected with a second point B' of the display 130 with a cable for a transfer of an image signal to the display 130. A metal layer included in the display 130 may be grounded by the cable. For example, a ground line included in the cable may electrically connect a ground area (or a ground layer) provided in the PCB 160 and the metal layer of the display 130. However, in an embodiment, the cable may be understood as the concept including a flexible PCB (FPCB) or may be replaced with the FPCB.

The metal structure 101 may be connected with the ground area of the PCB 160 at a third point "B". In an embodiment, the metal structure 101 may be selectively connected with the ground area of the PCB 160 at a plurality of points. For example, the metal structure 101 may include a plurality of switches that electrically connect the metal structure 101 and the ground area of the PCB 160. The control circuit may allow the metal structure 101 to be connected with the ground area of the PCB 160 at 0, 1, or more points by opening or closing the plurality of switches.

The second point B' may be spaced apart by a given angle with respect to the first point "A". For example, the second point B' may make an angle of 90 degrees to the first point "A" with respect to the center of the display 130. In this regard, a description will be given with reference to FIGS. 3A and 3B.

Figure 3A:
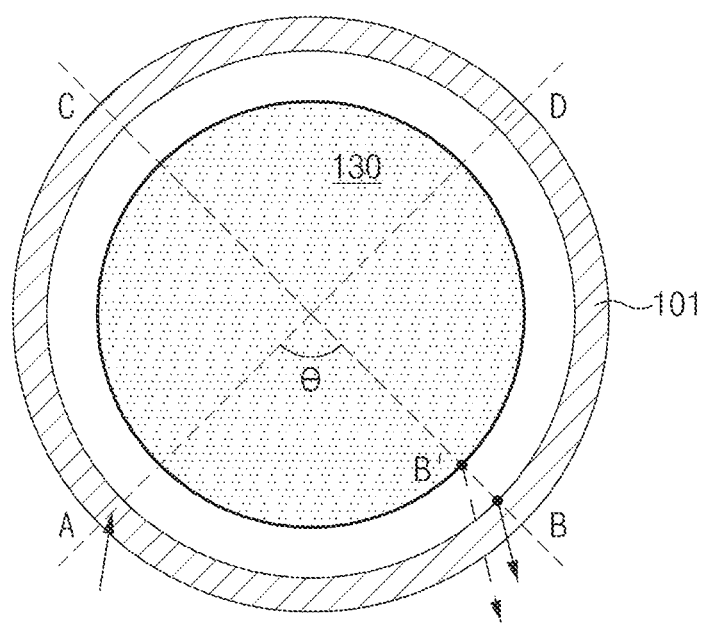
FIG. 3A illustrates a feeding location of the metal structure and a ground location of the display, according to an embodiment of the present disclosure.

FIG. 3A illustrates a feeding location of a metal structure and a ground location of a display according to an embodiment of the present disclosure.

Referring to FIG. 3A, feeding may be made at the "A" point of the metal structure 101. At any stationary time point, a potential of the "A" point at which the feeding is made may have the highest value in the metal structure 101, and a potential of a "D" point opposite to the "A" point may have the lowest value in the metal structure 101. For example, "A" may have any "+" potential value, and "D" may have any "−" potential value. That is, "+" charges may be induced around the "A" point, and "−" charges may be induced around the "D" point.

As charges are induced in the metal structure 101, opposite charges may be induced in the metal layer of the display 130. That is, "−" charges may be induced in an area adjacent to the "A" point, and "+" charges may be induced in an area adjacent to the "B" point.

A potential of "B" and "C" points that are intermediate points between "A" and "D" may correspond to "0" theoretically. Accordingly, an area adjacent to "B", for example, an area around B' of the display 130 may have a potential value substantially approximate to "0".

Accordingly, if electrically connecting B' and the ground area of the PCB 160 (e.g., through a cable), it may be possible to minimize the influence on a current induced in the display 130 (e.g., a metal layer). In other words, as the metal structure 101 is fed, a current may be induced indirectly (e.g., by coupling feeding) in the metal layer of the display 130, which is adjacent to the metal structure 101. A cable may be connected to the surrounding area of B' for the purpose of minimizing interception of a flow of a current induced in the metal layer. For example, a cable connected with the ground area of the PCB 160 may be connected to a location of B' having a given angle θ (e.g., 90 degrees) to the "A" point with respect to the center of the display 130.

Figure 3B:
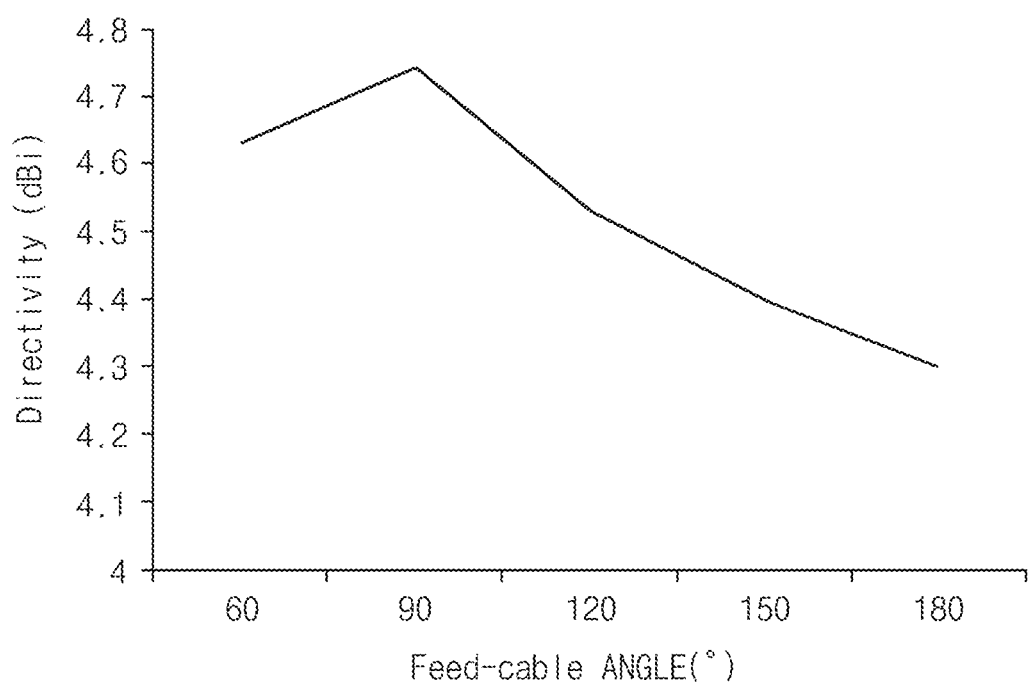
FIG. 3B is a graph illustrating an antenna gain varying depending on an angle between a feeding point and a cable connection point, according to an embodiment of the present disclosure.

FIG. 3B is a graph illustrating an antenna gain varying depending on an angle between a feeding point and a cable connection point according to an embodiment of the present disclosure. FIG. 3B illustrates a gain, which is associated with a first direction, that is, a direction perpendicular to a plane of the display 130, of a gain of an antenna using the metal structure 101.

Referring to FIG. 3B, it may be understood that a gain of an antenna is maximized when a feeding point and a cable connection point make an angle of about 90 degrees. Also, it may be understood that a radiation gain of the first direction decreases at 180 degrees, that is, as a cable is connected to a location completely opposite to the feeding point. Accordingly, it may be possible to situate the cable connecting the display 130 and the PCB 160 in an appropriate range (e.g., between ±30 from 90 degrees) in consideration of locations of components disposed in the wearable device 100, interference with another antenna, and a radiation gain of an antenna.

Figure 4A:
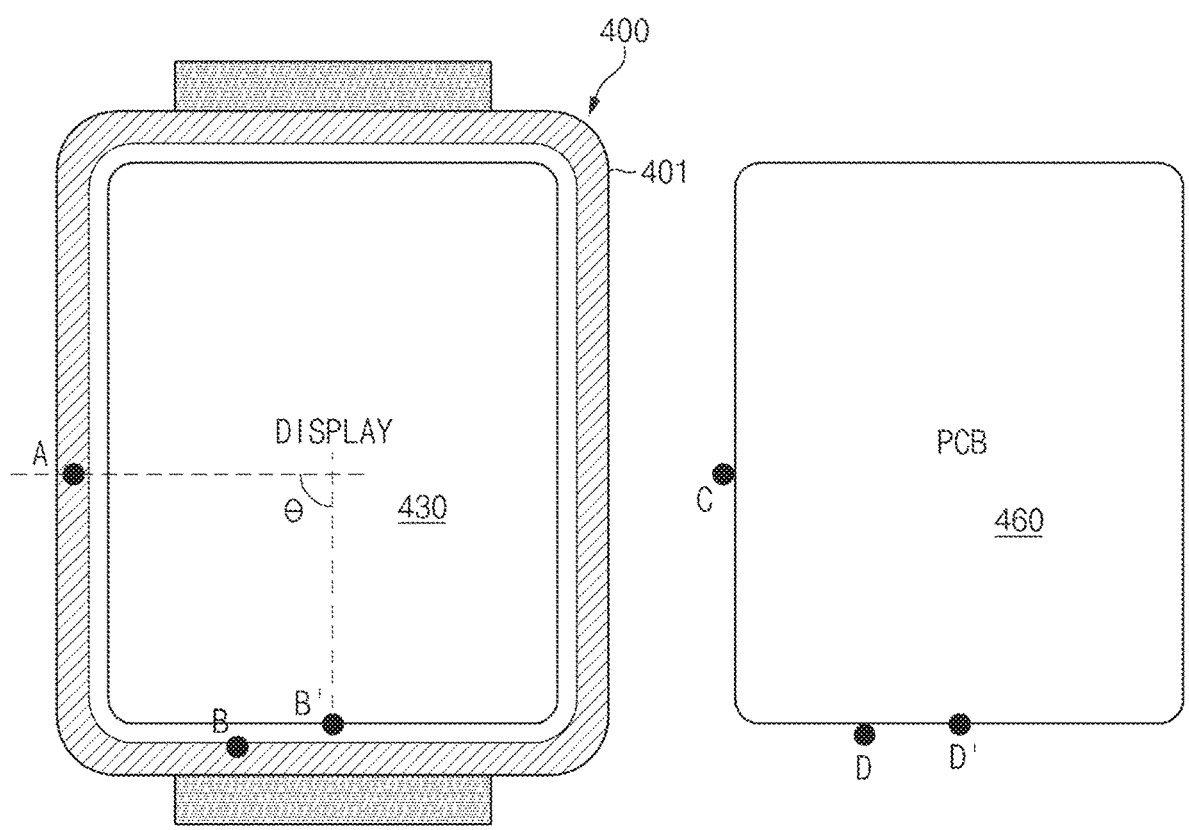
FIG. 4A illustrates a feeding location of the metal structure and a ground location of the display, according to an embodiment of the present disclosure.

FIG. 4A illustrates a feeding location of a metal structure and a ground location of a display according to an embodiment of the present disclosure.

Referring to FIG. 4A, a wearable device 400 according to another embodiment may have a quadrangular display structure having rounded edges instead of a ring-shaped display structure, unlike the device set forth in FIGS. 1 through 3B. For this reason, unlike the metal structure 101, a metal structure 401 may have a quadrangular shape having rounded edges, not a circular shape.

As in the description given with reference to FIG. 3A, feeding may be provided at a point "A" in the vicinity of the left center of metal structure 401. For convenience of description, a PCB 460 included in the wearable device 400 is separately illustrated on the right. Feeding may be provided at the point "A" of the metal structure 401 through a point "C" of the PCB 460 (A-C connection). In this case, a potential of a point B' in the vicinity of the center bottom may correspond to "0" theoretically. Although not illustrated, a potential of a point in the vicinity of the center top, which corresponds to the point "B", may correspond to "0" theoretically. A display 430 may be electrically connected with a ground plane of the PCB 460 at the point B' (B'-D' connection). Also, the metal structure 401 may be connected with the ground plane of the PCB 460 at the point "B" adjacent to the point B' (B-D connection). In this case, when viewing the display 430 from above, a first imaginary line extending from the center of the display 430 to the point "A" and a second imaginary line extending from the center to the point B' may be substantially orthogonal to each other.

Figure 4B:
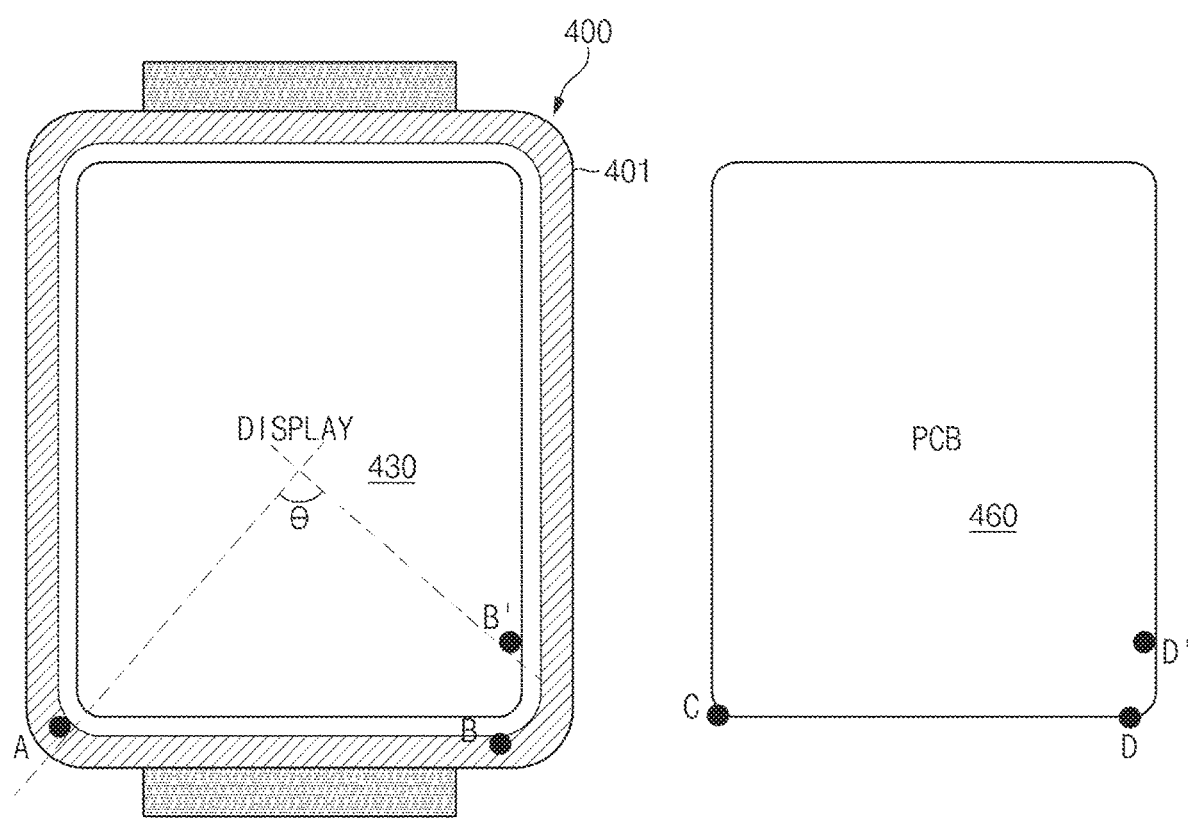
FIG. 4B illustrates a feeding location of the metal structure and a ground location of the display, according to an embodiment of the present disclosure.

FIG. 4B illustrates a feeding location of a metal structure and a ground location of a display according to an embodiment of the present disclosure.

Referring to FIG. 4B, a feeding point "A" to the metal structure 401 is at a left lower end. In this case, a theoretical ground point of the display 430 may correspond to B' of a right lower end, and the display 430 may be connected with a ground plane of the PCB 460 at the point B'. A theoretical description is the same as a description given with reference to FIGS. 3A and 4B and is thus omitted. As described above, one point of a display may be connected with a ground area at an appropriate point in various shapes of the display and a metal frame.

Figure 5:
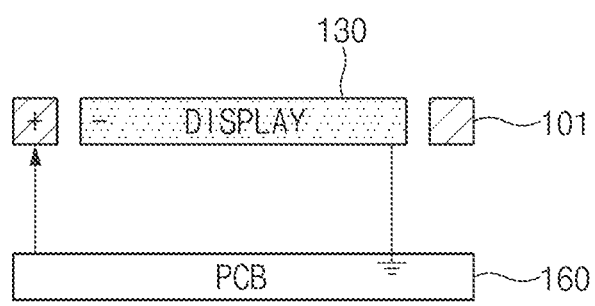
FIG. 5 illustrates feeding to the metal structure and cable connection associated with the display, according to an embodiment of the present disclosure.

FIG. 5 illustrates feeding to a metal structure and cable connection associated with a display according to an embodiment of the present disclosure.

Referring to FIG. 5, the PCB 160 may feed one point (e.g., a first point) of the metal structure 101. In an embodiment, the metal structure 101 may be connected with a ground of the PCB 160 at one or more points directly or through a switch structure.

The display 130 may be electrically connected with a ground area of the PCB 160 at one point (e.g., a second point). In this case, the display 130 may not be connected with, for example, the ground area at any other point except for the second point. Here, the second point may correspond to a point having an appropriate angle to the first point as described with reference to FIGS. 3A to 4B.

In the case where the display 130 is grounded on only one side, as illustrated in FIG. 5, a charge having a first polarity (e.g., a "+" polarity) may be induced in the metal structure 101 by feeding, and a charge having an opposite polarity (e.g., a "−" polarity) of the first polarity may be induced in the display 130 by the charge having the first polarity. As a result, the metal structure 101 and the display 130 may operate to be similar to a slot antenna (e.g., a slot mode is formed), thereby increasing the radiation efficiency of an antenna.

In the case where the display 130 is electrically connected with the ground area of the PCB 160 at two or more points, for example, in the case where the display 130 is electrically connected with the ground area of the PCB 160 even at a point illustrated in FIG. 5 as a charge of a "−" polarity is induced, a charge (e.g., having an opposite polarity) corresponding to a charge induced in the metal structure 101 may be interrupted from being induced in the display 130. Accordingly, the slot mode between the metal structure 101 and the display 130 is difficult to be formed, and thus, the radiation efficiency decreases. A graph associated with this is illustrated in FIG. 6.

Figure 6:
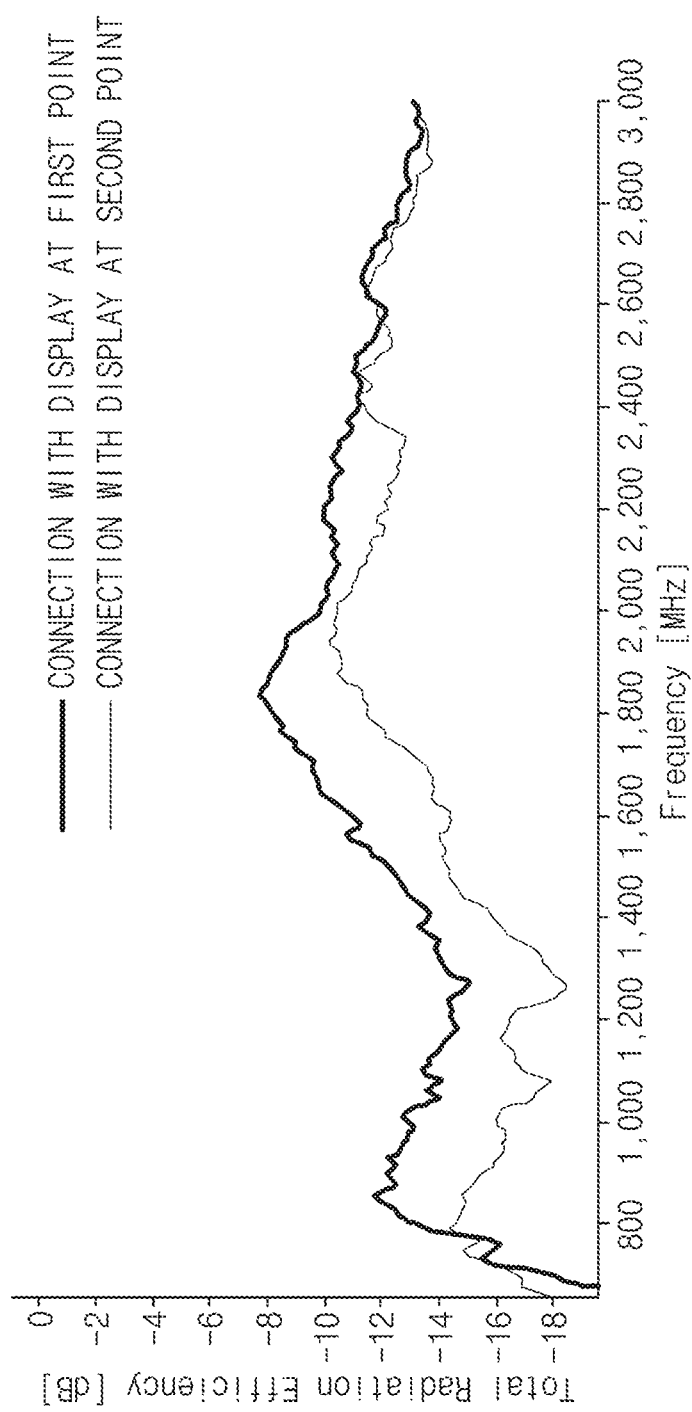
FIG. 6 illustrates a graph according to the number of points at which the display and the ground area are electrically connected, according to an embodiment of the present disclosure.

FIG. 6 illustrates a graph according to the number of points at which a display and a ground area are electrically connected according to an embodiment of the present disclosure.

Referring to FIG. 6, radiation efficiency according to a frequency when a ground is made at one point of the display 130 is marked by a thick solid line, and radiation efficiency according to a frequency when a ground is made at two points of the display 130 is marked by a thin solid line. It may be understood that the wearable device 100 has higher radiation efficiency in the case where a ground is made at one point over a range from 800 MHz to 2.4 GHz mainly used in a cellular network, a Wi-Fi network, a global positioning system (GPS) network, and the like.

Figure 7A:
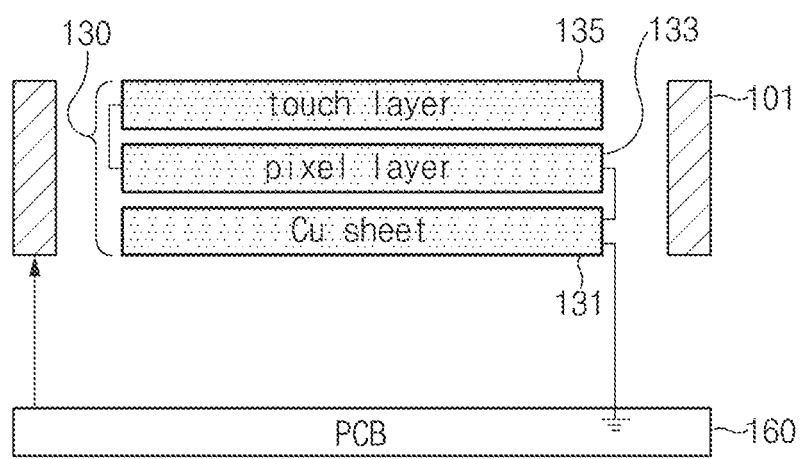
FIG. 7A illustrates a cable connection method of a pixel layer and a touch layer, according to an embodiment of the present disclosure.
Figure 7B:
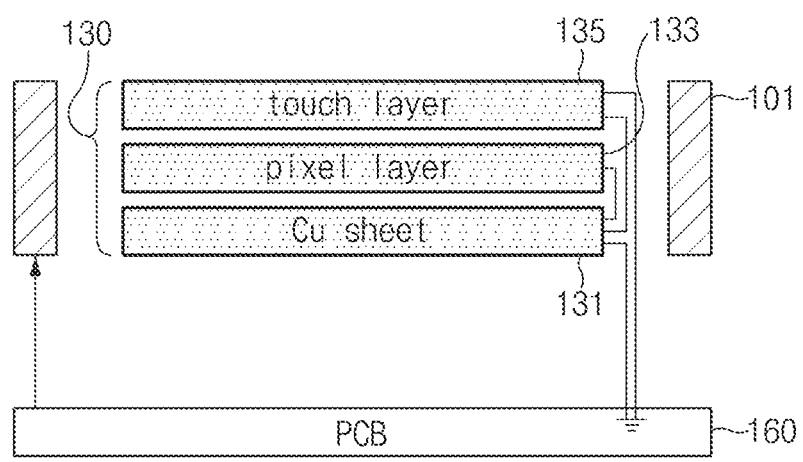
FIG. 7B illustrates a cable connection method of the pixel layer and the touch layer, according to an embodiment of the present disclosure.

FIGS. 7A and 7B illustrate exemplifications of cable connection according to a detailed structure of the display 130 according an embodiment of the present disclosure. For example, FIG. 7A illustrates a cable connection method of a pixel layer and a touch layer, according to an embodiment. FIG. 7B illustrates a cable connection method of a pixel layer and a touch layer, according to another embodiment.

Referring to FIG. 7A, the display 130 may include a Cu sheet 131, a pixel layer 133, and a touch layer 135. The Cu sheet 131 may correspond to the above-described metal layer. The pixel layer 133 indicates a layer in which red, green, and blue (RGB) pixels for color expression are arranged. For example, the pixel layer 133 may be understood as a layer in which light emitting diode (LED), organic LED (OLED), or liquid crystal display (LCD) pixels are arranged. The touch layer 135 indicates a layer in which a circuit for sensing a touch input by a user is disposed.

As well as the layers illustrated in FIG. 7A, various layers such as a polarizing plate, an adhesive layer, a pressure sensor, and the like may be included in the display 130. Also, the touch layer 135 may be integrally implemented in the pixel layer 133. For example, the embodiments may be applied to a display of an on-cell manner or an in-cell manner.

Referring to FIG. 7A, one point of the Cu sheet 131 may be connected with a ground area of the PCB 160. Also, the pixel layer 133 may be connected with the Cu sheet 131 for a ground. Also, the touch layer 135 may be connected with the Cu sheet 131 through the pixel layer 133 for a ground.

A cable may include signal lines for operating a display (pixel) and a touch function as well as a ground line. That is, in the embodiment of FIG. 7A, the cable starting from the PCB 160 may be connected to the Cu sheet 131 and the pixel layer 133 at one point of the display 130. In FIG. 7A, the Cu sheet 131 is exemplary, and the Cu sheet 131 may be replaced with or understood as an appropriate conductive layer. Below, for convenience of description, it is assumed that the conductive layer is the Cu sheet 131. A cable for driving and grounding the touch layer 135 may be connected with the touch layer 135 at one point of the pixel layer 133. That is, a ground of the Cu sheet 131 may be maintained at one point while providing a ground and a signal to both the pixel layer 133 and the touch layer 135.

Unlike the exemplification of FIG. 7A, for example, in an exemplification of FIG. 7B, a plurality of cables extending from the PCB 160 and the display 130 may be connected. For example, a first cable may connect the PCB 160 and the Cu sheet 131, and a second cable may connect the PCB 160 and the touch layer 135. The display 130 may have an internal wiring structure connecting the Cu sheet 131, the pixel layer 133, and the touch layer 135. The wiring and cable structure may be variously modified and implemented under the condition that only one point of the Cu sheet 131 is connected with the ground area of the PCB 160. For example, a first cable may connect the PCB 160 and the pixel layer 133, and a second cable may connect the PCB 160 and the touch layer 135.

The exemplifications illustrated in FIGS. 7A and 7B indicate that a cable from the PCB 160 toward the display 130 is integrally implemented. Compared with a conventional structure in which a cable for control of the display 130 (e.g., the pixel layer 133) and a cable for control of a touch screen ground the display 130 at different points, since a ground is made at one point of the display 130, radiation efficiency in various embodiments may be improved.

Figure 8:
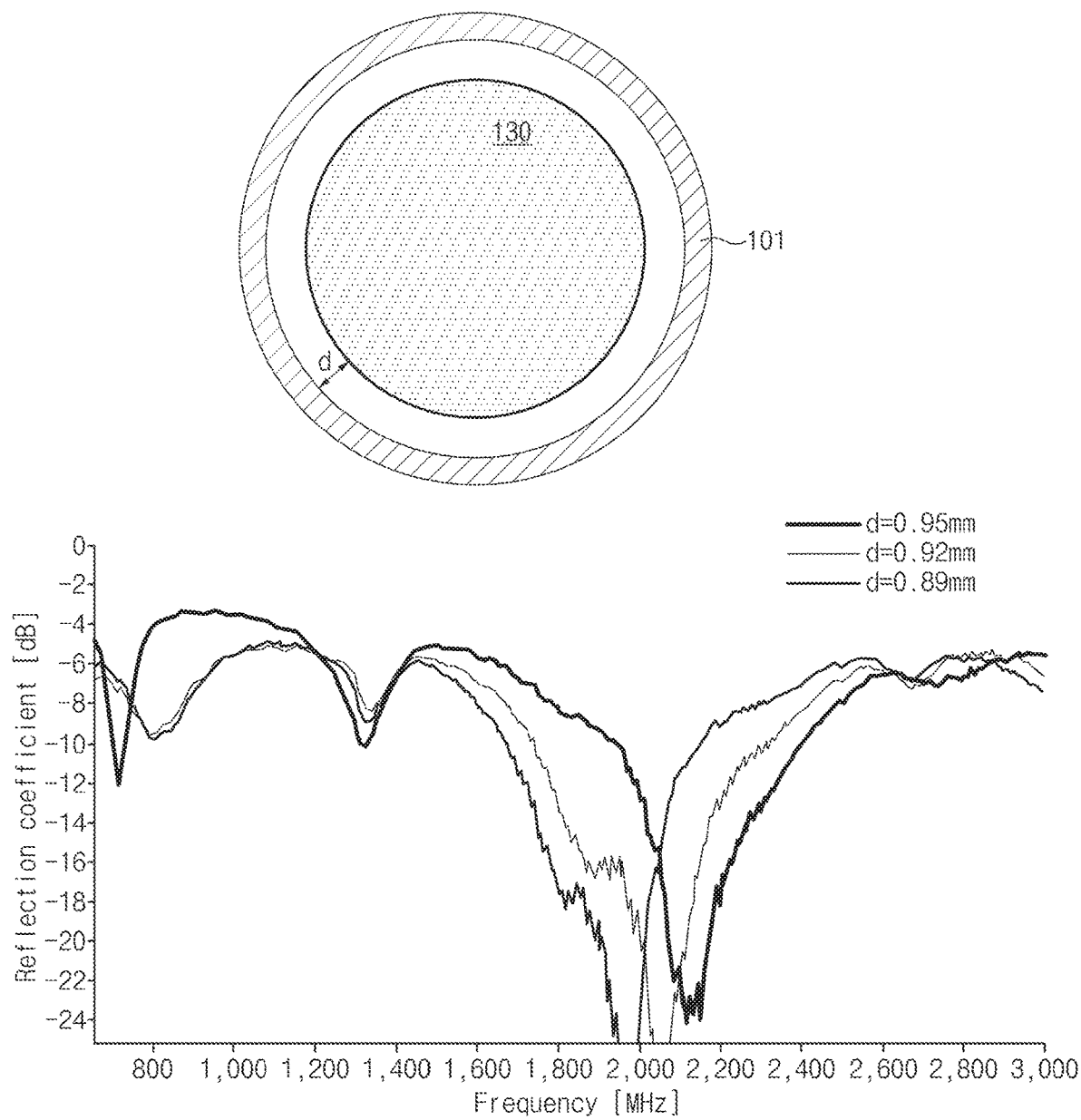
FIG. 8 illustrates a resonant frequency varying depending on a gap between the display and the metal structure, according to an embodiment of the present disclosure.

FIG. 8 illustrates a resonant frequency varying depending on a gap between a display and a metal structure according to an embodiment of the present disclosure.

Referring to FIG. 8, the display 130 may be understood as a metal layer, for example, the Cu sheet 131. An antenna structure illustrated in FIG. 8 may be understood as viewing an antenna illustrated in FIGS. 2, 3A, 3B, 5, 7A, and/or 7B on an upper side.

In an embodiment, the display 130 may include a metal layer, and the metal layer may be disposed in the inside of the metal structure 101 so as to be spaced apart by a given gap "d". The display 130 and the metal structure 101 of a wearable device is exemplified in FIG. 8 as being circular, but may be modified by one skilled in the art to have an oval, a quadrangle, or the like.

For example, radiation efficiency in the case where the gap "d" has a default value of 0.95 mm is illustrated in the graph of FIG. 8. For example, when "d"=0.95 mm, the wearable device 100 may form resonance at about 2.15 GHz. If "d" decreases from the default value by 0.03 mm (e.g., if "d" is 0.92 mm), a resonant frequency may shift to about 2.05 GHz. If "d" decreases from the default value by 0.06 mm (e.g., if "d" is 0.89 mm), a resonant frequency may shift to about 1.96 GHz. Accordingly, it may be possible to finely adjust a resonance frequency by adjusting the size of a gap that the display 130 and the metal structure 101 of the wearable device 100 have.

Figure 9:
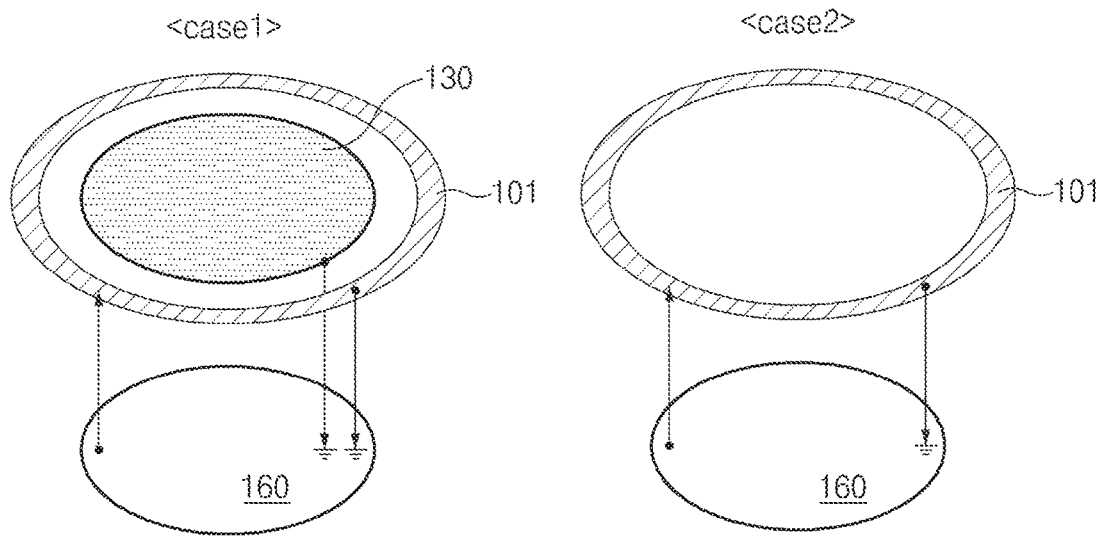
FIG. 9 illustrates a radiation pattern associated with existence of the display and a mounting situation, according to an embodiment of the present disclosure.
Figure 9:
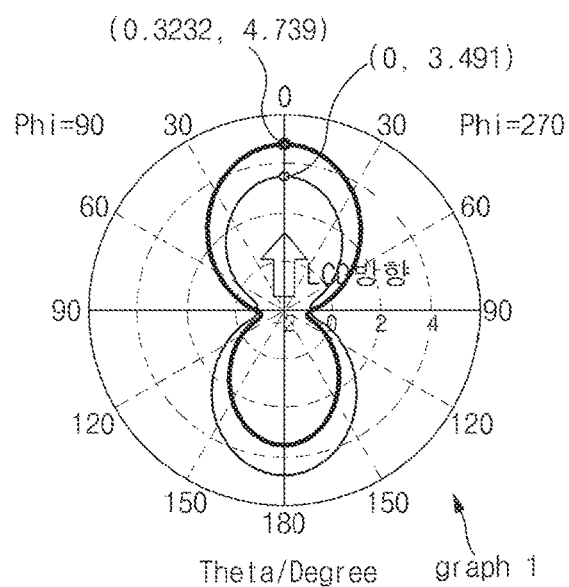
Figure 9:
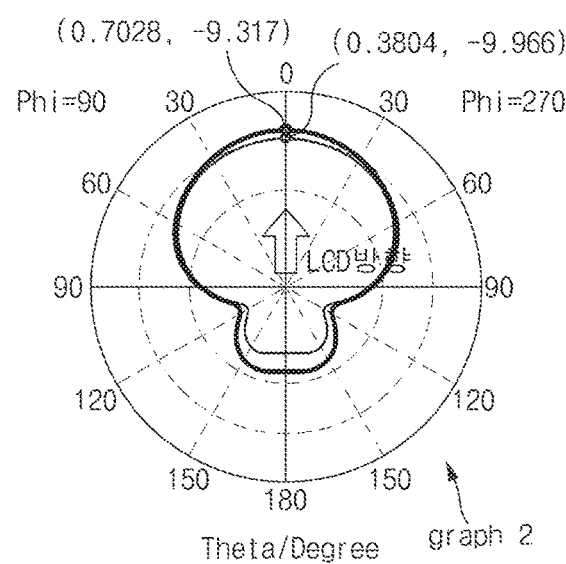

FIG. 9 illustrates a radiation pattern associated with existence of a display and a mounting situation according to an embodiment of the present disclosure.

<Case 1> of FIG. 9 assumes the case where the display 130 according to various embodiments operates as a partial radiator of a patch antenna, and <case 2> of FIG. 9 assumes the case where the display 130 does not operate as a partial radiator of the patch antenna. For comparison, <Case 2> may be understood as the case where the display 130 does not exist.

Referring to FIG. 9, a first graph "graph 1" indicates radiation patterns of <case 1> and <case 2> in a state where a user does not wear the wearable device 100. A radiation pattern corresponding to <case 1> is illustrated by a thick solid line, and a radiation pattern corresponding to <case 2> is illustrated by a thin solid line. In <case 1>, the display 130 operates as a parasitic patch antenna through coupling, and thus, the directivity in an LCD direction (e.g., a first direction) increases compared with <case 2> in which no display 130 exists.

In FIG. 9, a second graph "graph 2" indicates radiation patterns of <case 1> and <case 2> in a state where the user wears the wearable device 100. Radiation in a second direction (e.g., a direction opposite to the LCD direction) is limited by his/her body in a state where the user wears the wearable device 100 on his/her wrist, and the radiation pattern of the first direction is strengthened. That is, since the directivity in the first direction increases under a wrist-mounted condition, loss generated in the wrist decreases, thereby increasing the overall antenna gain.

According to an embodiment, the performance to receive a signal may increase by allowing one point of the display 130 to operate as a parasitic patch antenna connected with a ground area. For example, like a GPS signal, in the case of receiving a signal from a satellite for the purpose of seizing location information of the wearable device 100, it may be possible to increase the performance to receive a signal.

Figure 10A:
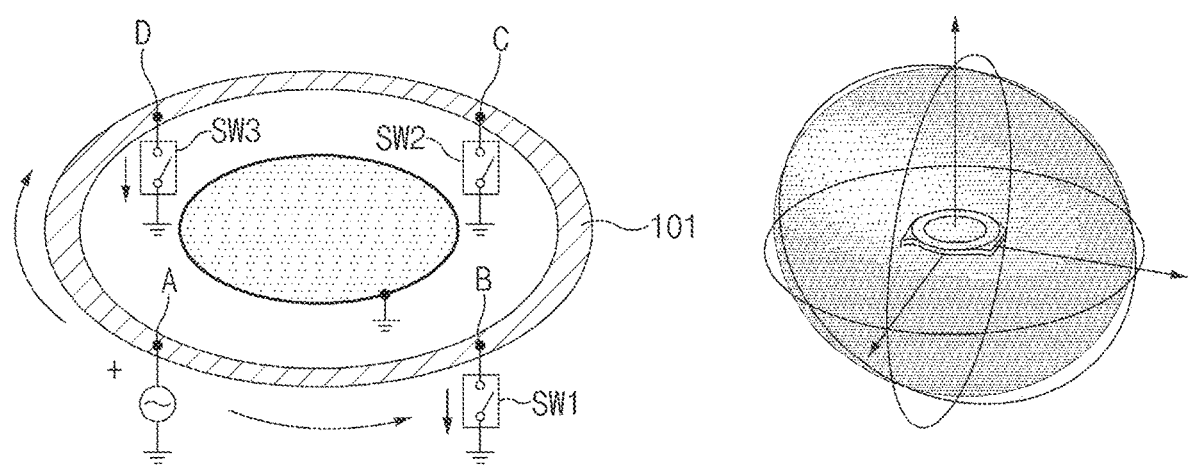
FIG. 10A illustrates an exemplification in which the metal structure and the ground area are connected to each other at a plurality of points, according to an embodiment of the present disclosure.

FIG. 10A illustrates an exemplification in which a metal structure and a ground area are connected to each other at a plurality of points according to an embodiment of the present disclosure.

Figure 10B:
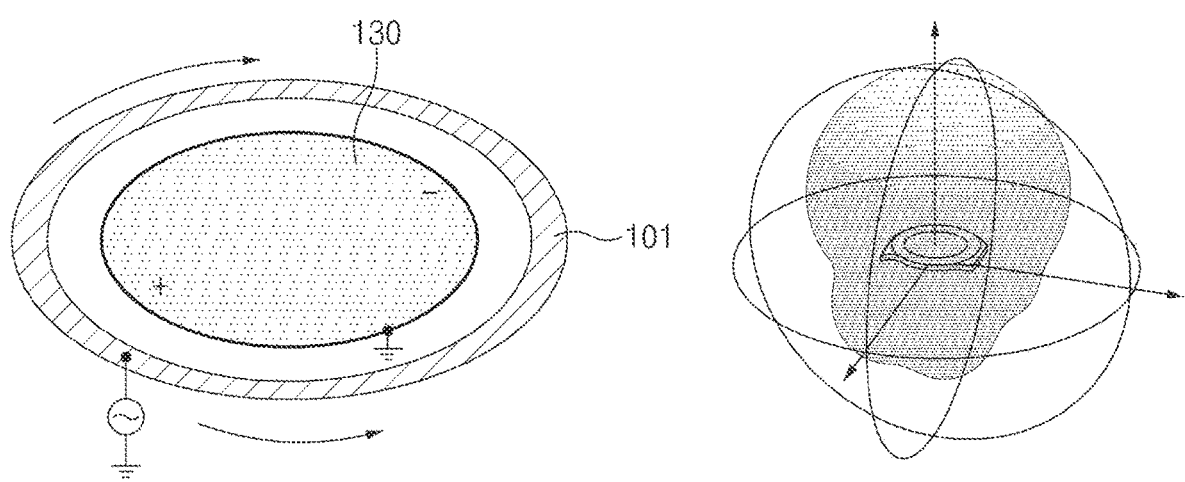
FIG. 10B illustrates an exemplification in which the metal structure and the ground area are not connected to each other according to an embodiment of the present disclosure.

FIG. 10B illustrates an exemplification in which a metal structure and a ground area are not connected to each other according to an embodiment of the present disclosure.

Referring to FIG. 10A, the metal structure 101 may be connected with a C-clip or the like including a switch. For example, when feeding is made at a first point "A" of the metal structure 101, a plurality of points "B", "C", and "D" of the metal structure 101 may be connected with a ground area. For example, the metal structure 101 may be connected with the ground area at the three different points "B", "C", and "D". The ground area may be located in the PCB 160 or may correspond to another metal component in the wearable device 100.

In FIG. 10A, an electrical path of a loop shape connecting the ground area—the feeding point—the ground point—the ground area may be formed. For example, in the case of FIG. 10A, at least two loop structures may be formed along an arrow direction. When such loop structures are formed, an antenna of the wearable device 100 may have an omni-directional radiation pattern in which the directivity is small, as illustrated in FIG. 10A. That is, the antenna of the wearable device 100 may have a radiation pattern that is somewhat uniform in all directions.

FIG. 10B may correspond to a state where switches SW1, SW2, and SW3 of FIG. 10A are open. In this case, the metal layer of the display 130 may operate as a patch antenna by a current induced in the metal structure 101. In this state, the antenna of the wearable device 100 may have a directional radiation pattern that faces the first direction (e.g., a front side of a display) as illustrated in FIG. 10B.

A control circuit of the wearable device 100 may control an open/close of switches connected with the metal structure 101 depending on a situation. For example, since a direction of an antenna continuously varies in a situation where a user walks while wearing the wearable device 100, the control circuit may short the switches to allow the antenna to operate in a loop mode. As another example, in the case where the user views the display 130 of the wearable device 100, the control circuit may open the switches to allow the antenna to operate in a patch mode.

Such a mode change may be made based on a sensor mounted in the wearable device 100 or an application or the like being executed in the wearable device 100. For example, the wearable device 100 may include a motion sensor that senses movement of the wearable device 100. For example, the motion sensor may correspond to at least one or more of an acceleration sensor, an inertia sensor, or a gyro sensor. If the movement sensed by the motion sensor is determined as a walk or a run (e.g., as a direction of an antenna continuously varies) in which a loop mode is appropriate, the control circuit may short the switches to allow the antenna to operate in the loop mode. However, if a direction of a display sensed by the motion sensor is sensed as facing a specific direction or being maintained in the specific direction, the control circuit may sense that the user views a screen of the wearable device 100 and may allow the antenna to operate in the patch mode. In another exemplification, in the case where a screen of the display 130 of the wearable device 100 is in an ON state, the control circuit may sense that the user views a screen of the wearable device 100 and may allow the antenna to operate in the patch mode.

In an embodiment, the control circuit may control a short switch that connects the metal structure 101 and the ground area in various cases. For example, the control circuit may sense movement of a user's wrist by using the motion sensor and may control the short switch to allow the antenna to have a directional radiation pattern whenever it is determined the user raises his/her hand.

Also, the control circuit may switch to an antenna pattern suitable for an application being executed. For example, in the case where an application such as golf, swimming, or running is being executed, the wearable device 100 needs to seize an accurate location of the user through GPS. In this case, to receive a satellite signal well, the wearable device 100 may open all switches to allow an antenna to have a directional radiation pattern.

Besides, the control circuit may sense whether the wearable device 100 is mounted by using an optical sensor (e.g., a camera, an illumination sensor, an infrared sensor, or the like) and may control the switches so as to have different radiation patterns depending on whether the wearable device 100 is mounted. Also, the control circuit may sense heat generated from a wrist upon wearing the wearable device 100 through a temperature sensor, to control the switches for the purpose of decreasing a specific absorption rate (SAR). For example, the control circuit may control the switches so as to operate in the patch mode in which a radiation pattern of an LCD direction is focused, instead of the loop mode in which a radiation pattern of a wrist direction is mainly formed. Various embodiments will be described with reference to FIG. 10C.

Figure 10C:
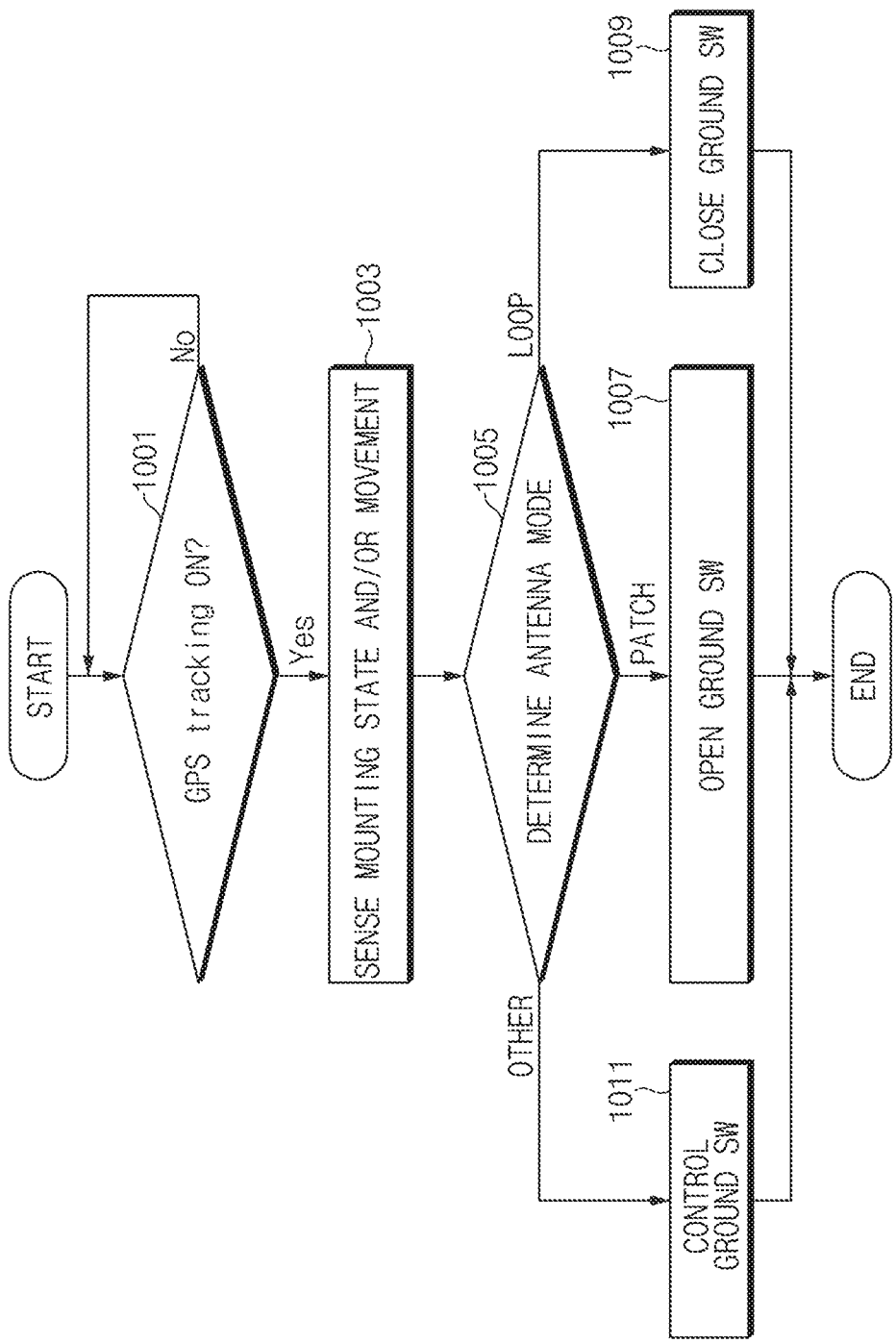
FIG. 10C illustrates a switch control scenario of an antenna according to an embodiment of the present disclosure.

FIG. 10C illustrates a switch control scenario of an antenna according to an embodiment of the present disclosure.

Referring to FIG. 10C, in operation 1001, the control circuit of the wearable device 100 may determine whether GPS tracking is in an ON state. In the case where the GPS tracking is deactivated by user settings or device settings, the wearable device 100 may control an antenna for the purpose of receiving a signal of a cellular network or another network such as a Wi-Fi network.

In the case where the GPS tracking is activated, in operation 1003, the wearable device 100 may sense a mounting state and/or movement of the wearable device 100. For example, the wearable device 100 may sense the mounting state and/or the movement by using an acceleration sensor, a gyro sensor, an inertia sensor, a heartbeat sensor, or the like.

In operation 1005, the wearable device 100 may determine an antenna mode suitable for a current state. The wearable device 100 may use information about the mounting state and/or the movement collected in operation 1003 for the purpose of determining the antenna mode. Also, additionally or alternatively, the wearable device 100 may further utilize an operation state of a hardware element of the wearable device 100, an operation state of software being executed, or the like. For example, the wearable device 100 may utilize whether a display is in an ON state as information for determining the antenna mode. Also, the wearable device 100 may utilize an application or a function being executed as information for determining the antenna mode.

For example, as described with reference to FIGS. 10A and 10B, in the case where a golf or running application is being executed, the control circuit may determine that a patch mode in which a GPS signal is well received is appropriate. Alternatively, in the case where a screen of the display 130 is in an ON state, the control circuit may sense that the user views a screen of the wearable device 100 and may determine that to operate the antenna in the patch mode is appropriate. In this case, the wearable device 100 may open all ground switches (e.g., SW1, SW2, and SW3) in operation 1007 and may allow the antenna to operate in the patch mode for the purpose of receiving the GPS signal well.

For another example, if the movement sensed by a motion sensor is determined as a direction of the antenna continuously varies like a walk or a run, the control circuit may determine that the loop mode is appropriate. In this case, the wearable device 100 may close at least a part (e.g., SW1 and SW3) of the ground switches (e.g., SW1, SW2, and SW3) in operation 1009 and may allow the antenna to operate in the loop mode.

Besides, the control circuit may appropriately control the close/open of the switches (e.g., SW1, SW2, and SW3) to receive a signal of a specified frequency band. For example, the wearable device 100 may be optimized to receive a Wi-Fi signal in a first switch combination (e.g., SW1 is shorted and SW2 and SW3 are opened). For another example, the wearable device 100 may be optimized to receive a signal of WCDMA band 1 (a 2.1-GHz band) in a second switch combination (e.g., SW1 and SW3 are opened and SW2 is shorted). In addition to the loop mode or the patch mode, the control circuit may appropriately control the open/close of the switches in operation 1011 depending on a current operation state, thereby securing optimal performance.

According to an embodiment, information for controlling at least one or more switches (e.g., SW1, SW2, and SW3) depending on an operation state of the wearable device 100 may be stored in a memory of the wearable device 100.

Figure 11:
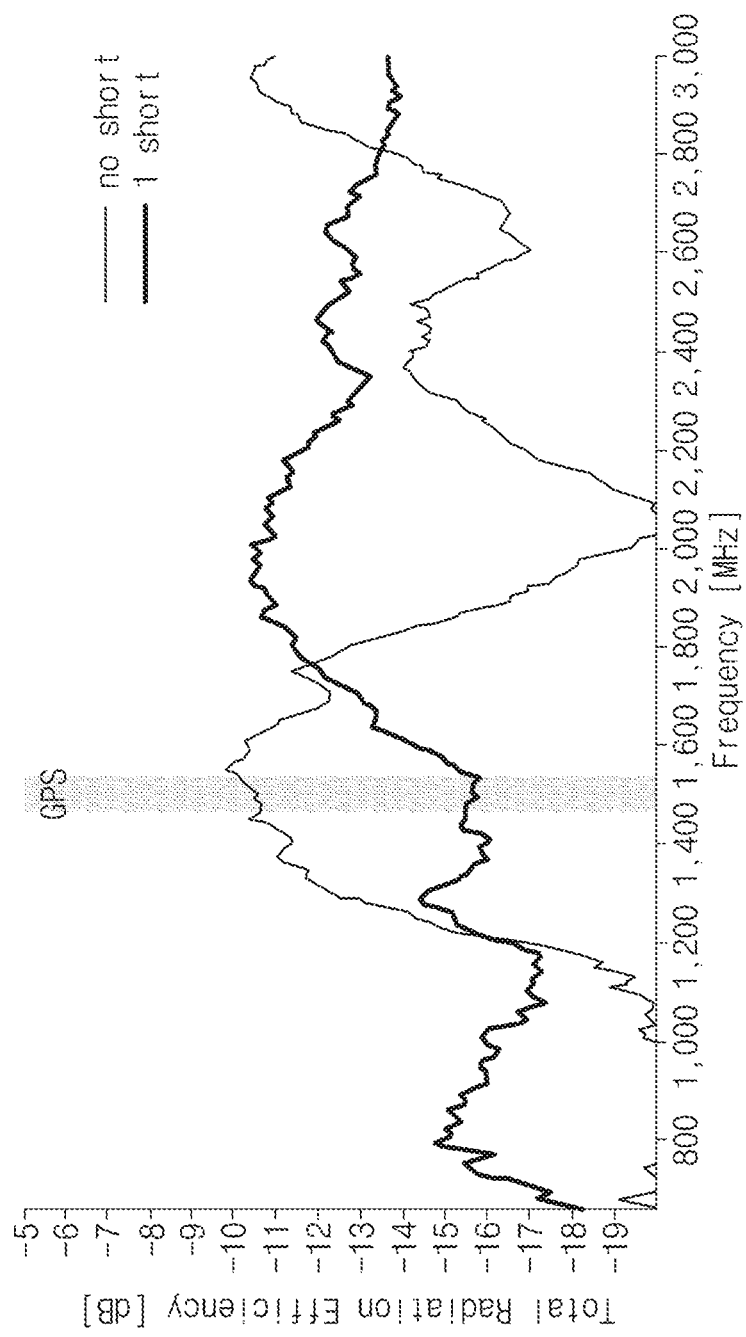
FIG. 11 illustrates radiation efficiency for each frequency band, which varies depending on the number of ground connections between the metal structure and the ground area according to an embodiment of the present disclosure.

FIG. 11 illustrates radiation efficiency for each frequency band, which varies depending on the number of ground connections between a metal structure and a ground area according to an embodiment of the present disclosure.

Referring to FIG. 11, it may be understood that efficiency of a signal in a band of about 1800 to 2100 MHz is good when a ground is made at one point of a metal structure (e.g., the metal structure 101). In the case where a ground of the metal structure is disconnected through switches or the like, that is, in the case where the metal structure 101 is not grounded, it may be understood that a signal in about 1500 MHz is good. Accordingly, to improve sensitivity to receive a GPS signal using a frequency of about 1500 MHz, in the case where an application in which GPS is used or is important is being executed, a control circuit may control switches such that switches between the metal structure 101 and a ground area are opened (a ground is not made).

Below, a hardware or software configuration applicable to the wearable devices according to various embodiments will be described with reference to FIGS. 12 to 14.

Referring to FIGS. 1 to 11, a wearable electronic device according to an embodiment may include a housing including an upper surface, a lower surface, and a side surface surrounding a space between the upper surface and the lower surface. In this case, the side surface may include a ring-shaped member that is ring-shaped when viewed from an upper side of the upper surface and is formed of a conductive material. In an embodiment, the ring-shaped member may be substantially a circular shape when viewed from the upper side of the upper surface. In another embodiment, the ring-shaped member may be substantially a square or a rectangle.

Also, the wearable device may include a binding structure connected to the housing and removably mountable in a part of a body of a user. However, in an embodiment, the binding structure may be separated from the wearable device.

The wearable device may include a display (e.g., the display 130) including a first ground plane, which is substantially in parallel with the upper surface, in the space. The display may be exposed through the upper surface. Also, the wearable device may include a PCB (e.g., the PCB 160) including a second ground plane, which is disposed between the display and the lower surface, in the space, a wireless communication circuit disposed in the PCB and electrically connected with a first point (e.g., the point "A" of FIG. 2) located in the ring-shaped member, a first conductive path electrically connected between a second point (e.g., the point B' of FIG. 2) located at a rim of the first ground plane and the second ground plane, a second conductive path electrically connected between a third point (e.g., the point "B" of FIG. 2) located at the ring-shaped member and the second ground plane, and a processor disposed in the space and electrically connected to the display and the communication circuit. In an embodiment, the communication circuit may be configured to receive a GPS signal.

According to an embodiment, when viewed from the upper side of the upper surface, a first imaginary line extending from a center of the upper surface to the first point may be substantially orthogonal to a second imaginary line extending from the center of the upper surface to the second point. Also, when viewed from the upper side of the upper surface, the first imaginary line may be substantially orthogonal to a third imaginary line extending from the center of the upper surface to the third point. Also, when viewed from the upper side of the upper surface, the second imaginary line and the third imaginary line may be substantially aligned with each other and may face in the same direction.

Also, according to an embodiment, when viewed from the upper side of the upper surface, the first imaginary line and the third imaginary line extending from the center of the upper surface to the third point may be substantially aligned with each other and may face in opposite directions.

According to an embodiment, the wearable device may further include a third conductive path electrically connected between a fourth point located at the ring-shaped member and the second ground plane, a fourth conductive path electrically connected between a fifth point located at the ring-shaped member and the second ground plane, a first switching circuit configured to open or close the second conductive path, a second switching circuit configured to open or close the third conductive path, and a third switching circuit configured to open or close the fourth conductive path, and the processor may selectively control the first to third switching circuits. Also, when viewed from the upper side of the upper surface, the first imaginary line may be substantially orthogonal to a fourth imaginary line extending from the center of the upper surface to the fourth point, and the first imaginary line and a fifth imaginary line extending from the center of the upper surface to the fifth point may be substantially aligned with each other and may face in opposite directions.

According to an embodiment, a wearable device may further include a detection circuit (e.g., a gyro sensor, an inertia sensor, or the like), which detects an orientation of the housing, in the housing, and the processor may selectively control the first to third switching circuits based at least partially on the detected orientation.

Figure 12:
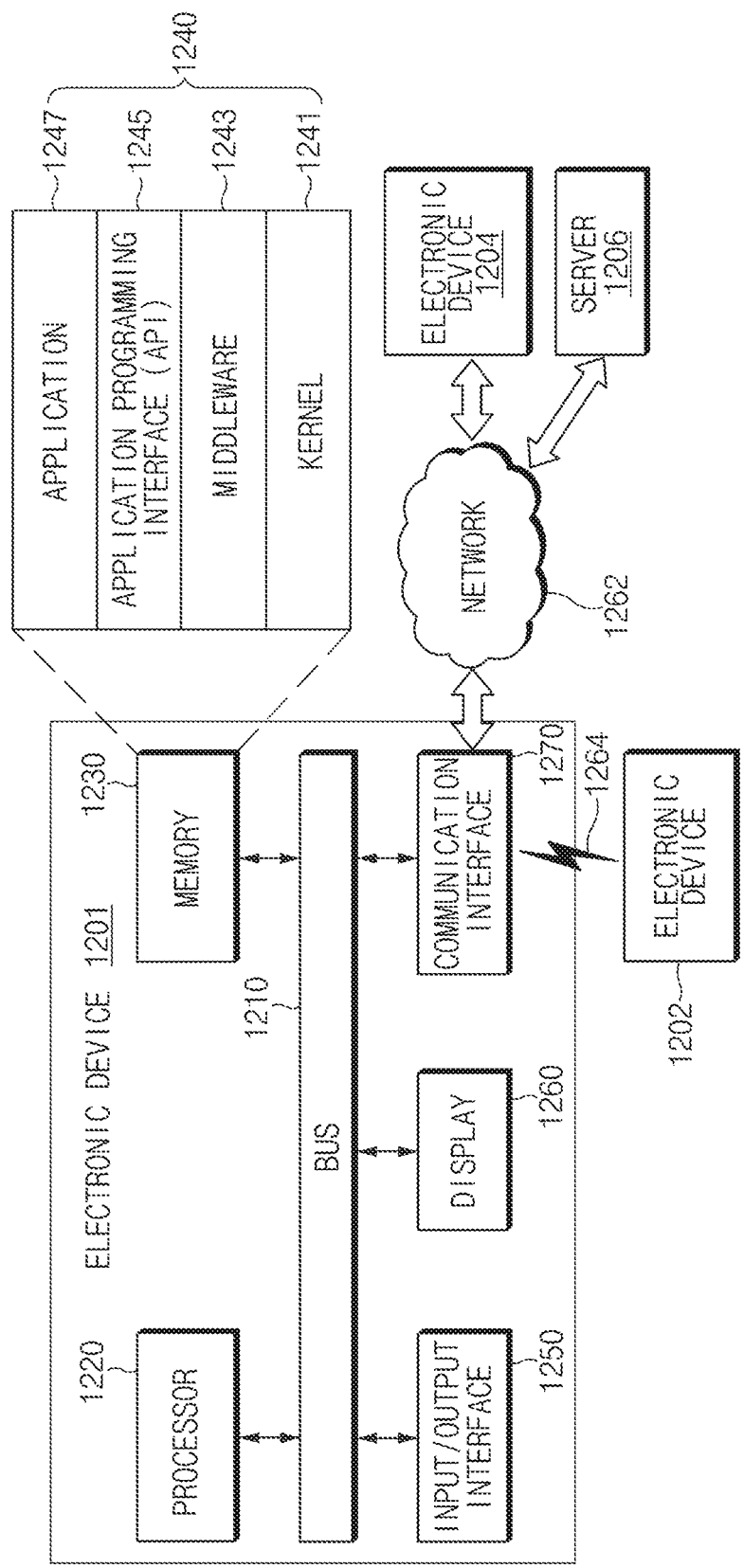
FIG. 12 illustrates an electronic device in a network environment according to an embodiment of the present disclosure.

FIG. 12 illustrates an electronic device in a network environment, according to an embodiment of the present disclosure.

Referring to FIG. 12, according to various embodiments, an electronic device 1201, a first electronic device 1202, a second electronic device 1204, or a server 1206 may be connected with each other over a network 1262 or local wireless communication 1264. The electronic device 1201 may include a bus 1210, a processor 1220, a memory 1230, an input/output interface 1250, a display 1260, and a communication interface 1270. According to an embodiment, the electronic device 1201 may not include at least one of the above-described elements or may further include other element(s).

For example, the bus 1210 may interconnect the above-described elements 1210 to 1270 and may include a circuit for conveying communications (e.g., a control message and/or data) among the above-described elements.

The processor 1220 may include one or more of a CPU, an AP, or a CP. For example, the processor 1220 may perform an arithmetic operation or data processing associated with control and/or communication of at least other elements of the electronic device 1201.

The memory 1230 may include a volatile and/or nonvolatile memory. For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process one or more task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, an interface which transmits an instruction or data input from a user or another external device, to other element(s) of the electronic device 1201. Furthermore, the input/output interface 1250 may output an instruction or data, received from other element(s) of the electronic device 1201, to a user or another external device.

The display 1260 may include, for example, a LCD, a LED display, an OLED display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first electronic device 1202, the second electronic device 1204, or the server 1206). For example, the communication interface 1270 may be connected to the network 1262 over wireless communication or wired communication to communicate with the external device (e.g., the second electronic device 1204 or the server 1206).

The wireless communication may use at least one of, for example, long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, the local wireless communication 1264. The local wireless communication 1264 may include at least one of wireless fidelity (Wi-Fi), Bluetooth (BT), near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a GPS, a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., local area network (LAN) or wide area network (WAN)), an Internet, or a telephone network.

Each of the first and second electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first electronic device 1202, the second electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 at other electronic device (e.g., the electronic device 1202 or 1204 or the server 1206). The other electronic device may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
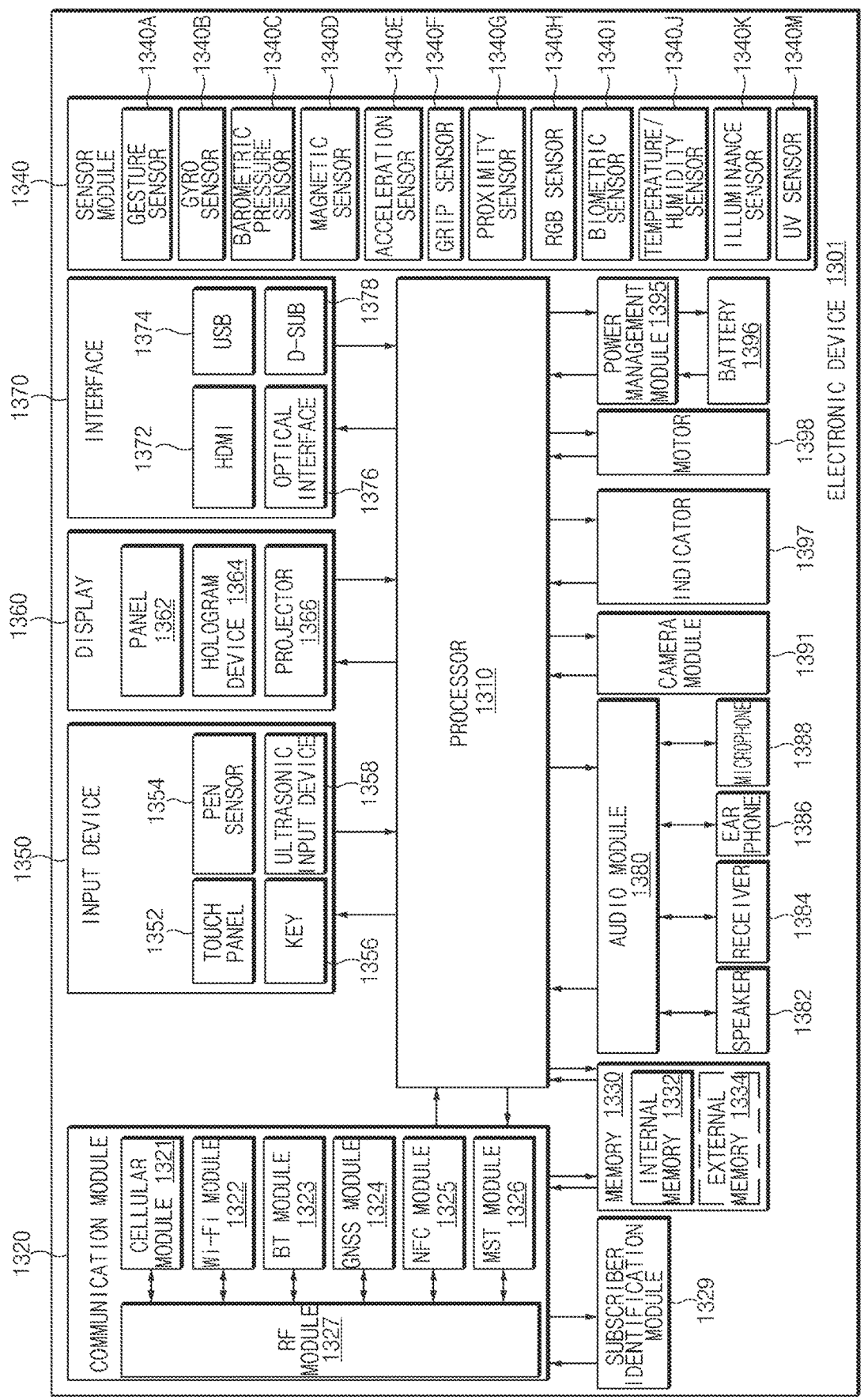
FIG. 13 is a block diagram of the electronic device according to an embodiment of the present disclosure.

FIG. 13 illustrates a block diagram of an electronic device, according to an embodiment of the present disclosure.

Referring to FIG. 13, an electronic device 1301 may include, for example, all or a part of the electronic device 1201 illustrated in FIG. 12. The electronic device 1301 may include one or more processors (e.g., an AP) 1310, a communication module 1320, a subscriber identification module (SIM) 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an OS or an application to control a plurality of hardware or software elements connected to the processor 1310 and may process and compute a variety of data. For example, the processor 1310 may be implemented with a system on chip (SoC). According to an embodiment, the processor 1310 may further include a graphic processing unit (GPU) and/or an image signal processor (ISP). The processor 1310 may include at least a part (e.g., a cellular module 1321) of elements illustrated in FIG. 13. The processor 1310 may load an instruction or data, which is received from at least one of other elements (e.g., a nonvolatile memory), into a volatile memory and process the loaded instruction or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a BT module 1323, a GNSS module 1324 (e.g., a GPS module, a Glonass module, a Beidou module, or a Galileo module), a NFC module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the SIM 1329. According to an embodiment, the cellular module 1321 may perform at least a portion of functions that the processor 1310 provides. According to an embodiment, the cellular module 1321 may include a CP.

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, or the MST module 1326 may be included within one integrated circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The SIM 1329 may include, for example, a card and/or embedded SIM that includes the SIME and may include unique identify information (e.g., integrated circuit card identifier (ICCID)) or subscriber information (e.g., international mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a SD card, which is removable, or may include an embedded secure element (eSE) embedded in a fixed chip of the electronic device 1301. Furthermore, the security module 1336 may operate based on an OS that is different from the OS of the electronic device 1301. For example, the security module 1336 may operate based on java card open platform (JCOP) OS.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., RGB sensor), a biometric sensor 1340I, a temperature/humidity sensor 1340J, an illuminance sensor 1340K, or an UV sensor 1340M. Although not illustrated, additionally or generally, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, or a keypad. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. According to an embodiment, the panel 1362 may include a pressure sensor (or force sensor) that measures the intensity of touch pressure by a user. The pressure sensor may be implemented integrally with the touch panel 1352, or may be implemented as at least one sensor separately from the touch panel 1352. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a HDMI 1372, a USB 1374, an optical interface 1376, or a D-subminiature (D-sub) 1378. The interface 1370 may be included, for example, in the communication interface 1270 illustrated in FIG. 12. Additionally or generally, the interface 1370 may include, for example, a mobile high definition link (MHL) interface, a SD card/MMC interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an ISP, or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile television (TV) may be included in the electronic device 1301. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 14:
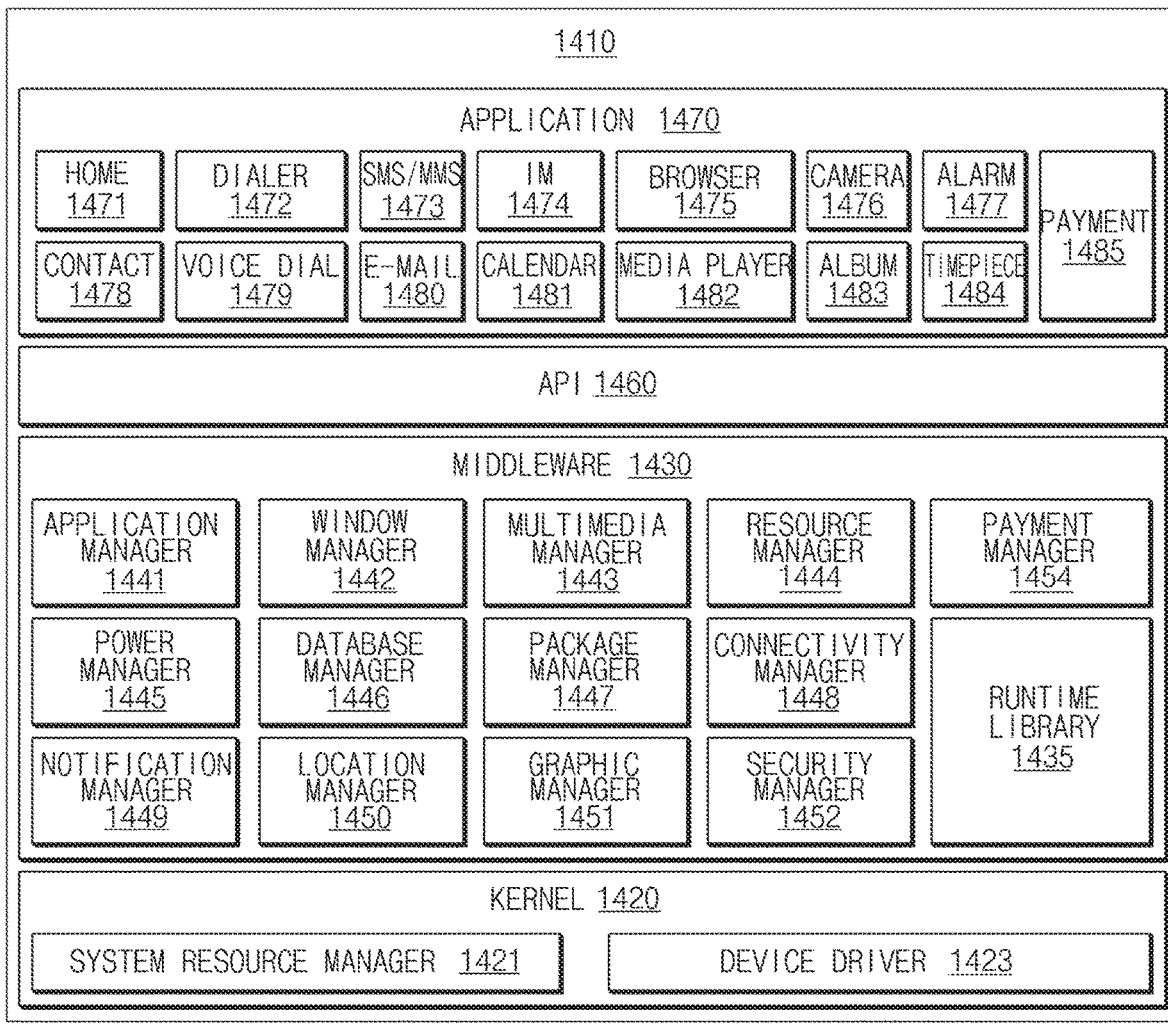
FIG. 14 is a block diagram of a program module according to an embodiment of the present disclosure.

FIG. 14 illustrates a block diagram of a program module according to an embodiment of the present disclosure.

According to an embodiment, a program module 1410 (e.g., the program 1240) may include an OS to control resources associated with an electronic device (e.g., the electronic device 1201), and/or diverse applications (e.g., the application program 1247) driven on the OS. The OS may be, for example, Android, iOS, Windows, Symbian, or Tizen.

The program module 1410 may include a kernel 1420, a middleware 1430, an API 1460, and/or an application 1470. At least a portion of the program module 1410 may be preloaded on an electronic device or may be downloadable from an external electronic device (e.g., the first electronic device 1202, the second electronic device 1204, the server 1206, or the like).

The kernel 1420 (e.g., the kernel 1241) may include, for example, a system resource manager 1421 or a device driver 1423. The system resource manager 1421 may control, allocate, or retrieve system resources. According to an embodiment, the system resource manager 1421 may include a process managing unit, a memory managing unit, a file system managing unit, or the like. The device driver 1423 may include, for example, a display driver, a camera driver, a BT driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format used for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or BT. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function used for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each OS kind to provide differentiated functions. Additionally, the middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, a payment 1485, health care (e.g., measuring an exercise quantity, blood sugar, or the like) or offering of environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the first electronic device 1202 or the second electronic device 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device. According to an embodiment, the application 1470 may include an application that is received from an external electronic device (e.g., the first electronic device 1202, the second electronic device 1204, or the server 1206). According to an embodiment, the application 1470 may include a preloaded application or a third party application that is downloadable from a server. The names of elements of the program module 1410 according to the embodiment may be modifiable depending on kinds of OSs.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 1220), may cause the one or more processors to perform a function corresponding to the instruction. The computer-readable storage media, for example, may be the memory.

A computer-readable recording medium may include a hard disk, a floppy disk, a magnetic media (e.g., a magnetic tape), an optical media (e.g., a compact disc ROM (CD-ROM) and a digital versatile disc (DVD), a magneto-optical media (e.g., a floptical disk)), and hardware devices (e.g., a ROM, a RANI, or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable device comprising:
a housing having a metal structure;
a display disposed in the housing, the display comprising a metal layer, the metal layer being disposed so as to be surrounded by the metal structure and to be spaced apart from the metal structure by a gap;
a printed circuit board (PCB) disposed in the housing, the PCB comprising a ground area;
a control circuit disposed on the PCB and electrically connected with the metal structure at a first point;
a motion sensor configured to sense movement of the wearable device; and
a plurality of switches connecting the metal structure and the ground area,
wherein the display is electrically connected with the ground area of the PCB at a second point spaced apart from the first point by an angle with respect to a center of the display,
wherein the control circuit is further configured to control the plurality of switches based on the sensed movement obtained from the motion sensor, and
wherein the control circuit is further configured to:
when the movement sensed by the motion sensor is determined as a direction of an antenna continuously varies in a specific period, control the plurality of switches to allow the antenna to operate in a loop mode, the loop mode being formed based on at least the metal structure and the ground area, and
when a direction of a display sensed by the motion sensor corresponds to a specific direction in the specific period, control the plurality of switches allow the antenna to operate in a patch mode, the patch mode being formed based on at least the metal layer.

2. The wearable device of claim 1, wherein the control circuit is further configured to:
receive a global positioning system (GPS) signal through an electrical path formed by the metal structure and the metal layer.

3. The wearable device of claim 1, wherein the metal layer is electrically connected with the ground area of the PCB at a third point spaced apart by an angle within a range of 60 degrees to 120 degrees with respect to the first point.

4. The wearable device of claim 1, wherein the metal layer is electrically connected with the ground area by a cable connecting the PCB and the display.

5. The wearable device of claim 1, wherein the display is not electrically connected with the ground area at any point other than the second point.

6. The wearable device of claim 1, wherein the metal layer corresponds to a copper (Cu) sheet.

7. The wearable device of claim 1, wherein the first point of the metal structure is connected with the PCB through a C-clip.

8. The wearable device of claim 1, wherein the control circuit is further configured to:

short the plurality of switches if a predefined movement is sensed.

9. The wearable device of claim 1, wherein the control circuit is further configured to:
open the plurality of switches if it is sensed that the display faces a specified direction.

10. The wearable device of claim 1, wherein the control circuit is further configured to:
open the plurality of switches if the display is in an ON state.

11. The wearable device of claim 1, wherein the control circuit is further configured to:
open the plurality of switches if a specified application is being executed.

12. The wearable device of claim 1,
wherein the display further comprises a pixel layer and a touch layer,
wherein the metal layer and the pixel layer are electrically connected with the ground area by a first cable connecting the PCB and the display, and
wherein the touch layer is connected with the pixel layer by a second cable.

13. The wearable device of claim 1, wherein the metal structure is electrically connected with the ground area at at least one point spaced part from the first point.

14. A wearable electronic device comprising:
a housing comprising:
an upper surface,
a lower surface, and
a side surface surrounding a space between the upper surface and the lower surface, the side surface comprising a ring-shaped member that is ring-shaped when viewed from an upper side of the upper surface and is formed of a conductive material;
a binding structure connected to the housing and removably mountable in a part of a body of a user;
a display exposed through the upper surface, the display comprising a first ground plane, which is substantially parallel with the upper surface, in the space;
a printed circuit board (PCB) comprising a second ground plane, which is disposed between the display and the lower surface, in the space;
a wireless communication circuit disposed in the PCB and electrically connected with a first point located in the ring-shaped member;
a first conductive path electrically connected between a second point located at a rim of the first ground plane and the second ground plane;
a second conductive path electrically connected between a third point located at the ring-shaped member and the second ground plane;
at least one processor disposed in the space and electrically connected to the display and the communication circuit;
a motion sensor configured to sense movement of the wearable device; and
a plurality of switch circuits connecting the side surface of the housing and the second ground plane,
wherein the first point and the second point are spaced apart by an angle of 120 degrees or less with respect to a center of the upper surface,
wherein the at least one processor is configured to control the plurality of switch circuits based on the sensed movement obtained from the motion sensor, and
wherein the at least one processor is further configured to:
when the movement sensed by the motion sensor is determined as a direction of an antenna continuously varies in a specific period, control the plurality of switches to allow the antenna to operate in a loop mode, the loop mode being formed based on at least a metal structure and a ground area, and
when a direction of a display sensed by the motion sensor corresponds to a specific direction in the specific period, control the plurality of switches allow the antenna to operate in a patch mode, the patch mode being formed based on at least a metal layer.

15. The wearable electronic device of claim 14, wherein the first point and the third point are spaced apart by an angle within a range of 60 degrees to 120 degrees with respect to the center of the upper surface.

16. The wearable electronic device of claim 15, wherein, when viewed from the upper side of the upper surface, the center of the upper surface, the second point and the third point are aligned in a straight line.

17. The wearable electronic device of claim 16, further comprising:
a third conductive path electrically connected between a fourth point located at the ring-shaped member and the second ground plane; and
a fourth conductive path electrically connected between a fifth point located at the ring-shaped member and the second ground plane,
wherein the plurality of switch circuits comprises:
a first switching circuit configured to open or close the second conductive path,
a second switching circuit configured to open or close the third conductive path, and
a third switching circuit configured to open or close the fourth conductive path, and
wherein the at least one processor is further configured to selectively control the first to third switching circuits.

18. The wearable electronic device of claim 17,
wherein the first point, the second point, the third point and the fourth point are further configured to provide, when viewed from the upper side of the upper surface, a first imaginary line extending from the center of the upper surface to the first point that is substantially orthogonal to a fourth imaginary line extending from the center of the upper surface to the fourth point, and
wherein the first point, the second point, the third point, the fourth point and the fifth point are further configured to provide, when viewed from the upper side of the upper surface, the first imaginary line and a fifth imaginary line extending from the center of the upper surface to the fifth point that are substantially aligned with each other and face in opposite directions.

* * * * *